Figure 1:
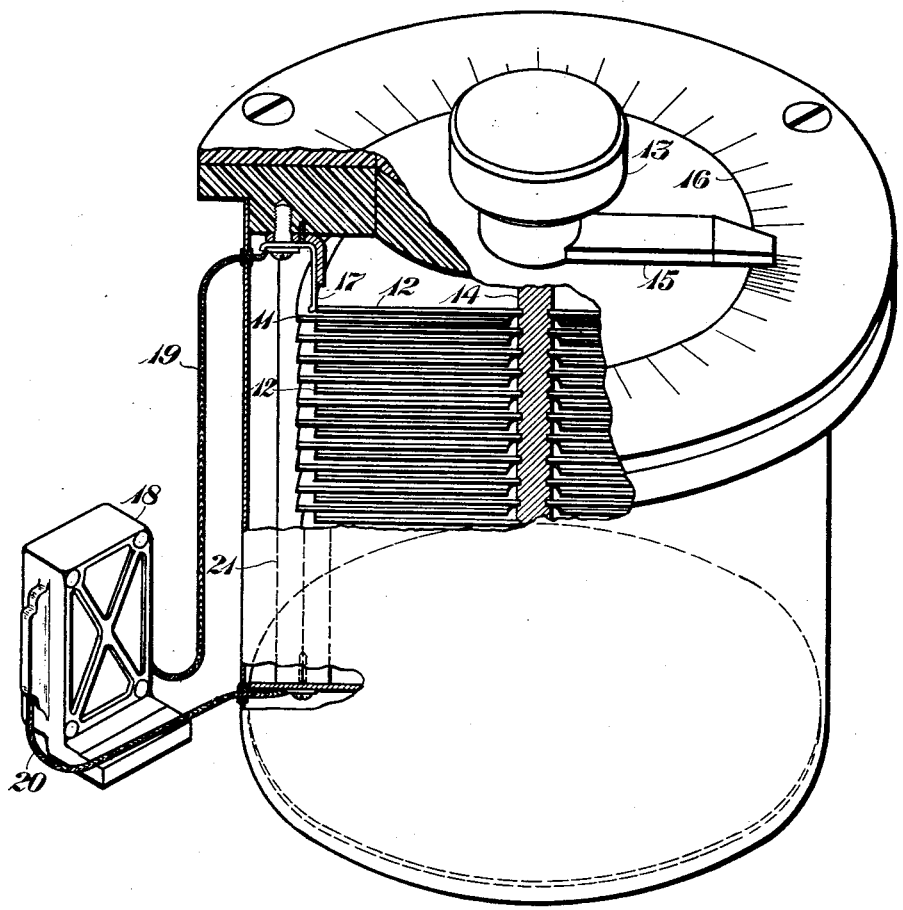

H. W. HITCHCOCK.
ELECTRICAL MEASURING APPARATUS.
APPLICATION FILED SEPT. 11, 1918.

1,373,504.

Patented Apr. 5, 1921.
2 SHEETS—SHEET 1.

INVENTOR.
Harry W. Hitchcock
BY G. E. Folk,
ATTORNEY

H. W. HITCHCOCK.
ELECTRICAL MEASURING APPARATUS.
APPLICATION FILED SEPT. 11, 1918.

1,373,504.

Patented Apr. 5, 1921.
2 SHEETS—SHEET 2.

INVENTOR.
Harry W. Hitchcock
BY G. E. Folk,
ATTORNEY

UNITED STATES PATENT OFFICE.

HARRY W. HITCHCOCK, OF NEW YORK, N. Y., ASSIGNOR TO AMERICAN TELEPHONE AND TELEGRAPH COMPANY, A CORPORATION OF NEW YORK.

ELECTRICAL MEASURING APPARATUS.

1,373,504.   Specification of Letters Patent.   Patented Apr. 5, 1921.

Application filed September 11, 1918. Serial No. 253,651.

*To all whom it may concern:*

Be it known that I, HARRY W. HITCHCOCK, residing at borough of Bronx, city of New York, in the county of Bronx and State of New York, have invented certain Improvements in Electrical Measuring Apparatus, of which the following is a specification.

This invention relates to improvements in electrical measuring apparatus, and more particularly to improvements in variable air condensers, whereby the number of fixed and movable plates usually required for a given maximum capacity may be reduced.

In the construction of the well known types of variable air condensers heretofore used having fixed and movable plates, it has been customary to arrange a group of equal sized, semicircular metallic plates in a parallel and horizontal formation with a uniform air space between the adjacent plates of said group. These plates are arranged symmetrically so that their diameters are in the same plane, all plates being on the same side of said plane and rigidly held in that position.

Associated with said fixed group of plates is a movable group of plates each of the latter plates being rigidly connected to a rotatable spindle, the axis of which is concentric with the axis of the said fixed group of plates. By rotating said spindle the movable group may be moved into closer space relation with, or away from said fixed group each movable plate entering into or receding from its corresponding air space in said fixed group, whereby the magnitude of the electrostatic capacity between said plates may be varied.

The maximum capacity of such type of condenser depends upon the area, the total number of and the separation between such plates. Variable air condensers of large magnitudes electrically are consequently quite heavy, and of considerable volume, which increases both the weight and the size of the electrical apparatus with which they are customarily associated.

My invention consists in combining with a variable condenser, whose maximum capacity is substantially one-half of the desired maximum capacity, a fixed condenser having substantially the same capacity as the maximum capacity of the variable condenser thereby obtaining by this combination the desired maximum capacity and also the desired intermediate capacities between the minimum of the air condenser and the maximum capacity of the two condensers in parallel. Since the weight and volume of a fixed condenser are small in comparison with a variable condenser having the same capacity, it is apparent that by combining a fixed and a variable condenser as aforementioned, I obtain a combination condenser having the desired maximum capacity, but of lighter weight and smaller volume than a variable condenser of the type heretofore used having the same maximum capacity.

The nature of the invention will appear more clearly by considering the following description of the apparatus together with the accompanying drawings in which Figure 1 shows in perspective a variable air condenser having a portion of the face plate and of the casing removed, so as to show more clearly the means whereby the fixed condenser is associated with the variable condenser. Figs. 2, 3, 4 and 5 show schematically the manner in which the range of measurement of the variable condenser is increased.

In Fig. 1, 11 represents one of a fixed group of semicircular parallel plates which are rigidly supported horizontally and electrically connected by means of the metallic supporting rods of which one is shown at 21. 12 represents one of a movable group of plates which may be inserted between the said fixed plates by rotation of the handle 13, which is attached to the rotatable spindle 14, to which each plate of the movable group is rigidly attached. A pointer 15, attached to the handle 13, indicates on the scale 16 the magnitude of the capacity of said condenser for the relative position of the movable and fixed plates at that instant. A contactor 17 is attached to the under side of the face plate, and is so adjusted as to make contact with the uppermost movable plate during one-half of the period of rotation of the handle 13, and during the continuance of such electrical contact a fixed condenser 18 which may be of any type is connected in parallel with said variable condenser, one side of said fixed condenser being connected to contactor 17, by means of conductor 19 and the other side being connected with the group of fixed plates by means of conductor 20 which is attached to one of the rods 21 that support all of said plates.

Figure 2:
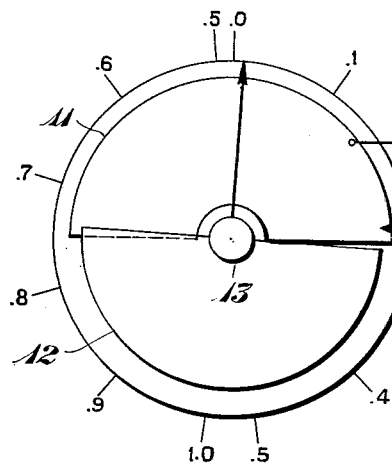
Figure 3:
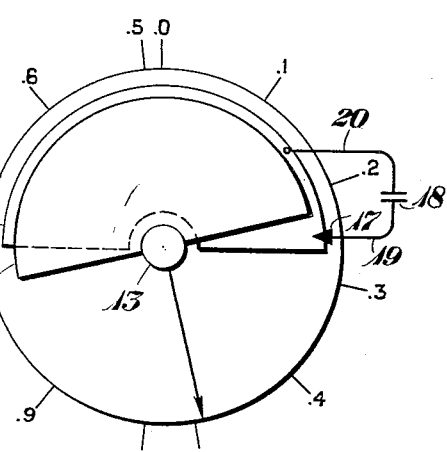
Figure 4:
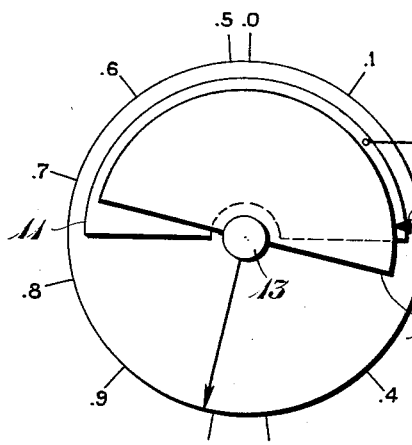
Figure 5:
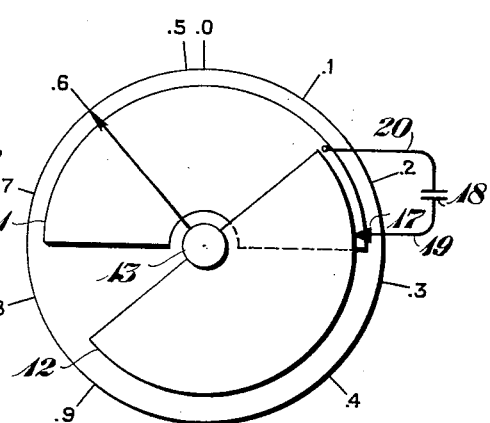

The operation of this condenser will be more fully understood by reference to Figs. 2, 3, 4 and 5 in which the same reference numerals are used as in Fig. 1 to represent the same parts. In Fig. 2, the movable group 12 is about to be brought into closer proximity to the fixed group 11, by rotation of the handle 13 thereby tending to increase the magnitude of the capacity of the condenser. Fig. 3 represents the condition when the movable group 12 has been brought almost entirely within the semi-circular area of the fixed group 11, which, in the normal type of variable condenser, would represent the condition of approximately the maximum capacity of the condenser. However, it will be seen in Fig. 3 that the right hand corner (as shown in this figure) of the movable group is about to make contact with the contactor 17, and when contact is made, the effective capacity of the variable condenser is doubled since, as previously stated, the capacity of the fixed condenser equals the actual maximum capacity of the variable condenser when the plates of the movable groups are completely interposed between the fixed plates. In Fig. 4 the movable group 12 has made contact with contactor 17 and is being withdrawn from the fixed plates, thereby diminishing the total capacity of the condensers in parallel. Fig. 5 represents the condition that exists when the movable group has been almost entirely withdrawn from the fixed group of plates, so that the capacity is approaching that of the fixed condenser alone.

From this description it will be seen that by using this combination of a variable and a fixed condenser, the number of fixed and movable plates may be greatly reduced, thereby diminishing the weight and the volume of the adjustable condenser for a given maximum capacity.

Although this invention has been disclosed as embodied in a certain specific organization and arrangement of parts, it is to be understood that it is capable of embodiment in other and different forms without departing from the spirit and scope of the appended claims.

What is claimed is:

1. In electrical condensers, the combination of two groups of plates, one movable relative to the other, the plates of each group being arranged for interposition between and insulated from the plates of the other group, a fixed capacity condenser having one side fixedly connected with the plates of the fixed group, and a connecting device fixedly joined with the other side of the said fixed capacity condenser and making a slidable contact directly with one plate of the movable group, whereby the said fixed condenser may be automatically connected in parallel with the said variable condenser.

2. In electrical condensers, the combination of two groups of plates, one movable relative to the other, the plates of each group being arranged for interposition between and insulated from the plates of the other group, a condenser of definitely fixed capacity having one side permanently connected with the plates of the fixed group, and connecting means fixedly joined with one side of said fixed condenser and making a slidable contact directly with one plate of the movable group so that the fixed condenser may be automatically connected in parallel with the said groups of plates when the said plates occupy a certain relative position, and will be maintained so connected until the plates are moved to another definite relative position when the said fixed condenser may be disconnected.

3. In electrical condensers, a combination with a variable condenser having a plurality of fixed and movable plates of a fixed condenser having one side permanently connected with the said fixed plates and a connector arranged to make a slidable contact directly with the plates of the movable group thereby connecting the said fixed condenser in parallel with the said variable condenser and maintaining such connection while the capacity of the variable condenser is varied between certain limits.

4. In electrical condensers, the combination with a variable air condenser having groups of semicircular fixed and movable plates, of a fixed condenser having the one side permanently connected with the said fixed plates and connecting means arranged to make a slidable contact directly with the plates of the movable group whereby the said fixed condenser may be connected in parallel with the said variable condenser during a definite part of the time when the said groups of plates are being moved relative to each other.

5. In electrical condensers, the combination of a variable air condenser having fixed and movable plates so arranged that the capacity of the said condenser may be gradually varied by the relative movement of the two groups of plates, a separate fixed condenser, the capacity of which equals the maximum capacity of the variable condenser, having one side of the said fixed condenser permanently connected with the said fixed plates and connecting means arranged to make a slidable contact directly with the plates of the movable group whereby the said fixed condenser may be automatically connected in parallel with the variable condenser when the capacity of the variable condenser reaches its maximum value and maintained in such relationship until the capacity of the said variable condenser reaches its minimum value.

6. In electrical condensers, the combination with a variable air condenser of a fixed condenser having a capacity equal to the maximum capacity of the said variable condenser and having one side fixedly connected with one side of the said variable condenser and a connecting device arranged to make slidable contact directly with the plates of the movable group, whereby the said fixed condenser may be automatically connected in parallel with the said variable condenser when the latter has reached its maximum capacity and maintained in such relationship while the capacity of the said variable condenser is being reduced to its minimum and indicating means associated with the said variable condenser adapted to show the instantaneous capacity from the minimum capacity of the variable condenser to the maximum capacity of the two condensers in parallel.

7. In electrical condensers, the combination with a fixed group of metallic plates of a movable group of metallic plates adjusted so that the plates of each group may be interposed between the plates of the other group but insulated therefrom, a condenser of substantially uniform capacity having one side connected with one group of metallic plates and a connector arranged to make a slidable contact directly with the other group of plates whereby the said condenser may be automatically connected in parallel between the said fixed and movable groups of plates by the closing of the said movable contact when the said groups have reached a certain predetermined relative position and to remain so connected throughout the period of movement of the said plates until another predetermined relative position has been reached when the said condenser may be disconnected.

In testimony whereof, I have signed my name to this specification this 27th day of August, 1918.

HARRY W. HITCHCOCK.